A. L. COLE.
DEMOUNTABLE RIM.
APPLICATION FILED OCT. 1, 1917.
1,376,404. Patented May 3, 1921.
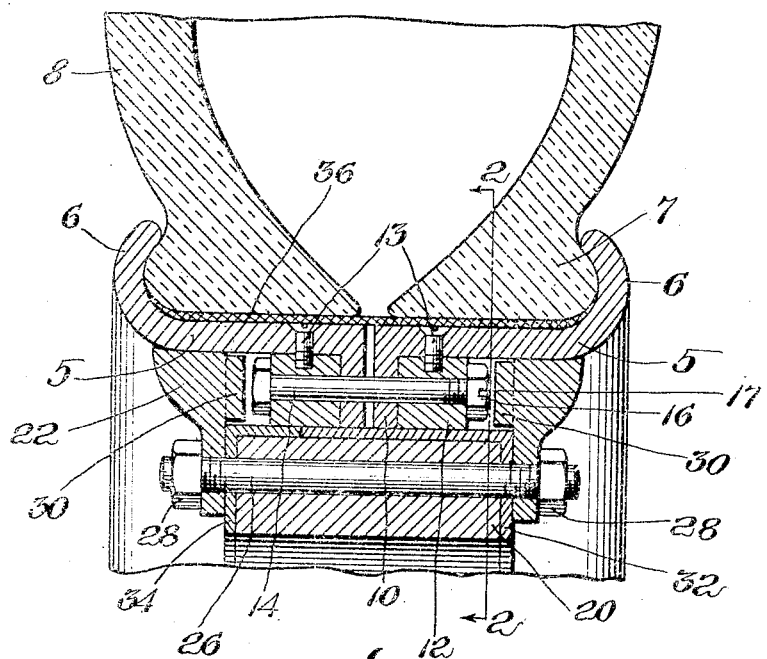
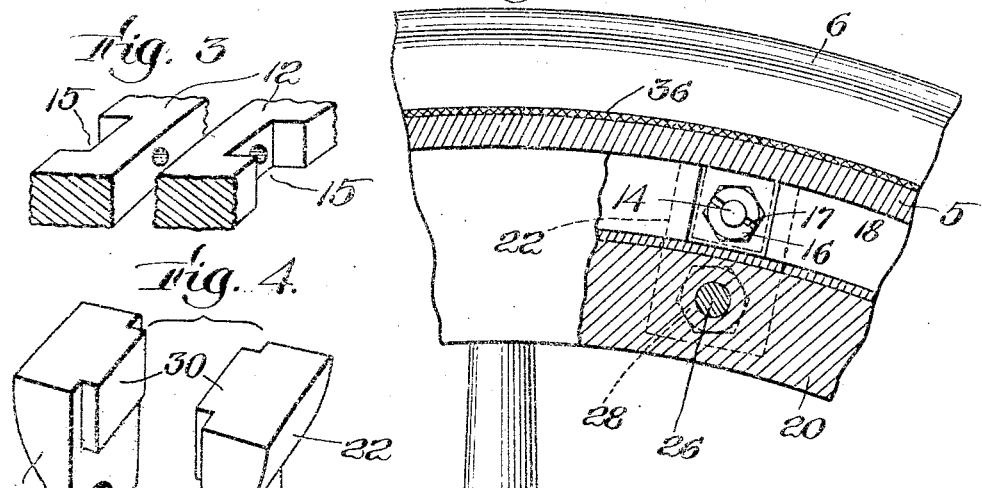
Inventor:
Albert L. Cole
By Francis J. Dakin
atty.

UNITED STATES PATENT OFFICE.

ALBERT L. COLE, OF AUBURNDALE, MASSACHUSETTS.

DEMOUNTABLE RIM.

1,376,404.   Specification of Letters Patent.   Patented May 3, 1921.

Application filed October 1, 1917. Serial No. 194,127.

*To all whom it may concern:*

Be it known that I, ALBERT L. COLE, a citizen of the United States, residing at Auburndale, in the county of Middlesex and State of Massachusetts, have invented a new and useful Improvement in Demountable Rims, of which the following is a specification, reference being had therein to the accompanying drawings.

This invention relates to demountable rims used in connection with vehicle wheels for carrying cushion or pneumatic tires.

The main object of my invention is to provide a demountable rim of such form of construction as to facilitate the insertion and the removal of a cushion or pneumatic tire within the rim so that a minimum amount of effort and time is required for these operations.

Another object of the invention is to provide simple means for securing the demountable rim upon the wheel felly against both lateral and longitudinal movement.

A further object of the invention is to provide a rim of simple construction which is strong and durable.

Additional objects of the invention will be more specifically described and pointed out hereinafter.

The preferred embodiment of my invention contemplates a demountable rim made in two sections of like construction, which, when assembled in longitudinal engagement, resemble a rim of ordinary construction, together with means for securing the two sections in assembled position and with means for holding the rim upon the vehicle wheel felly.

In the drawings illustrating the preferred embodiment of my invention, Figure 1 is a cross-sectional view of a portion of a wheel felly, having mounted thereon a demountable rim constructed in accordance with my invention, said rim carrying a pneumatic shoe of ordinary construction; Fig. 2 is a longitudinal sectional view on line 2—2 in Fig. 1 looking from right to left; Fig. 3 is a detail view in perspective to illustrate the means for securing the sections of the rim in assembled position, and Fig. 4 is a perspective view of the form of clamps used for holding the rim on the wheel.

Referring to the drawings, there is shown a rim comprising two circular sections 5, 5, these sections being substantially the sections which would be secured by cutting an ordinary solid rim longitudinally in the middle. Each section 5 is provided with a flange 6, adapted to hold one lip 7 of a pneumatic shoe 8 and a downwardly extending flange 10 on the inner edge of each section so that when the two sections are secured together in operative position the flanges 10 engage each other. In order to support the body portion of each section 5, a ring 12 is arranged underneath the body portion of each section between it and the wheel felly, the two rings 12 being secured permanently each to its respective section 5 by screws 13.

In order to hold the two sections 5 together in assembled position, the rings 12 are each provided with a plurality of recesses 15 arranged at regular intervals, the two rings being drawn together by bolts 14 and nuts 16, the head of the bolt and the nut being located within the recesses 15. The heads of the nuts may each be provided with a slot 17 so that the two sections may be drawn into engagement with each other by turning the nut with a suitable tool.

To hold the rim in position upon the wheel felly 20, I provide suitable clamps 22 (see Fig. 4), the upper surfaces of which engage the lower surfaces of the sections 5 and the lower portions of the clamps being each provided with a hole 24 to receive a bolt 26 secured in the wheel felly 20, the two ends of the bolt 26 being threaded to receive nuts 28. The inner side of each clamp is provided with a rectangular extension 30 adapted to enter the recess 15 when the clamp is in position.

If desired the wheel felly 20 may be provided with an outer covering of metal made in the form of two rings 32 and 34 L-shaped in cross-section, these two rings being of such respective dimensions that the joint where they meet is off center on the surface of the tread of the felly in order not to interfere with the drawing together of the two sections 5.

In the use of my rim the pneumatic shoe 8, with its inner tube, the latter not being shown in the drawings, is arranged with the lip 7 inclosed within the two flanges 6 of the sections 5. The bolts 14 are then arranged in the holes through the rings 12 and the flanges 10 and the nut 16 is screwed on to the end and tightened up until the two flanges 10 are in engagement with each other. As a general rule this is accomplished with very little difficulty as the shoe is mounted on the rim while in a deflated condition. In case any difficulty is met, drawing bolts may be used in the first instance for drawing the two portions of the rim together and after that has been accomplished, the drawings bolts may be removed one by one and the bolts 14 and nuts 16 substituted therefor and tightened up. In order to prevent the inner tube being caught or pinched between the two flanges 10 during this operation, a strip 36 of any suitable material may be inserted between the shoe and the rim section 5, this strip being of sufficient stiffness to prevent pinching. After the rim has been thus secured, the shoe may be inflated and is then ready for use when desired.

In mounting the rim with the shoe on the wheel felly 20 all that is necessary is to place the rim in position on the wheel felly then insert the clamps, place the nuts 28 on the bolts 26 and tighten them up. It is, of course, understood that the wheel felly and the sections 5 are provided with a suitable hole to receive the valve stem on the inner tube. It is unnecessary to show this in the drawings because it would be obvious to anyone skilled in the art.

The removal of the demountable rim from the wheel felly and the method of separation of the rim sections 5 in order to remove the shoe are perfectly obvious from the foregoing description.

It will be apparent that by providing what might be termed a split demountable rim, I have made the operations of setting a shoe within the rim one of comparative simplicity and one requiring no expenditure of strength and no special apparatus. In many of the demountable rims in use at the present time, the rims are split transversely and in order to set a shoe it is necessary to bend one of the ends toward the center by special apparatus so that the shoe may be removed or may be inserted. I have avoided, by my construction, the necessity for any special effort or special apparatus for the operations of setting the shoe in or removing it from the rim.

It is further to be observed that the rim is secured against longitudinal movement on the wheel fell under strain by the fact that the clamps are provided with portions which interlock with the demountable rim, and as the clamps are fixed in position by the bolts 26 on the wheel felly, no longitudinal movement is possible. It may further be observed that the demountable rim is supported at all points transversely from one side to the other.

It is to be understood that my invention may be embodied in other forms of construction than that herein shown and described and the invention is claimed broadly except where specifically limited in the following claim.

What I claim is:—

A demountable rim comprising two sections of like construction, each of said sections having a tread portion, an outer flange adapted to receive and inclose one lip of a shoe and an inner depending flange perpendicular to said tread portion, a ring rectangular in cross-section secured to said tread portion and fitting within the angle made by said tread portion and said depending flange for supporting the tread portion of said section, said inner flange and said supporting ring being adapted to engage the periphery of the wheel when said section is mounted thereon and means for securing said two sections in an assembled position before mounting on the wheel.

In witness whereof I hereunto set my hand this nineteenth day of September, 1917.

ALBERT L. COLE.